United States Patent [19]
Lee et al.

[11] 3,872,575
[45] Mar. 25, 1975

[54] OPTICAL TRANSDUCER SCALE

[75] Inventors: Charles Benjamin Lee, Minnetonka; Franz Ucko, Saint Paul, both of Minn.

[73] Assignee: Control Data Corporation, Minneapolis, Minn.

[22] Filed: Mar. 25, 1974

[21] Appl. No.: 454,350

[52] U.S. Cl.............. 29/475, 156/163, 156/252, 156/257, 156/263, 350/320
[51] Int. Cl. .......................................... G02b 27/00
[58] Field of Search ...... 29/475; 156/163, 252, 257, 156/263; 350/162 R, 320; 264/1, 2; 250/237 R, 237 G

[56] References Cited
UNITED STATES PATENTS

| | | | |
|---|---|---|---|
| 818,966 | 4/1906 | Ives | 350/162 R |
| 1,744,642 | 1/1930 | Kondo | 350/162 R |
| 2,071,921 | 2/1937 | Dickson | 156/252 |
| 2,232,551 | 2/1941 | Merton | 264/1 |
| 2,594,229 | 4/1952 | Snyder et al. | 156/163 |
| 3,542,453 | 11/1970 | Kantor | 264/1 |
| 3,585,121 | 6/1971 | Franks et al. | 264/1 |
| 3,600,588 | 8/1971 | Sayce | 250/137 R |

Primary Examiner—Al Lawrence Smith
Assistant Examiner—Robert C. Watson
Attorney, Agent, or Firm—Edward L. Schwarz

[57] ABSTRACT

An optical grating which has a preselected coefficient of thermal expansion can be made by attaching grating bars to a slotted plate having the desired coefficient of thermal expansion in a position making the bars visible through the slot. The grating bars are transverse to the slot and firmly bonded to its edges, and are carried by a transparent sheet whose effect on thermal expansion of the plate is negligible.

8 Claims, 3 Drawing Figures

PATENTED MAR 25 1975  3,872,575

OPTICAL TRANSDUCER SCALE

BACKGROUND OF THE INVENTION

1. Field of the Invention

In certain high-precision electro-mechanical positioning problems, the positioning is accomplished with reference to an optical grating having slits formed by bars spaced at intervals which correspond to the distance between adjacent stations at which the apparatus is to be positioned. Unnfortunately, thermally-induced dimensional changes in the grating and the apparatus cause the apparatus and the individual slits to shift mechanically with respect to each other. In such a case, even though the errors are on the order of millionths of an inch, it is necessary to compensate the positioning apparatus to cause the positioned apparatus to attain the desired positions. The problem arises, e.g. in the positioning of a transducing head adjacent the data tracks on a disc in a disc memory system. In a common implementation, the disc is made of aluminum, so if the frame of the optical gratinng is made of aluminum as well, compensation can be made to occur automatically. U.S. Pat. No. 3,720,930, having a common assignee with this application, discloses typical apparatus in which such a position sensor may be advantageously used.

2. Description of the Prior Art

The straightforward method of forming the desired bars by machining a plate of the appropriate material is a laborious and expensive task. For the necessary structural rigidity, it is necessary to have a relatively thick frame, and therefore to allow machining of the slits, an area must be thinned with a relatively deep machining operation, which must be done with reasonable accuracy, and hence is relatively expensive.

Attempts have been made to create the grating pattern on thin glass sheets and then bond the glass to a substrate having the required coefficient of thermal expansion. This approach has been unsuccessful because the low coefficient of thermal expansion for glass resulted in breaking of the glass sheets during normal temperature variations.

SUMMARY OF THE INVENTION

The frame, which furnishes the desired thermal expansion characteristics, is made from a plate having the desired coefficient of thermal expansion, by piercing the plate with a slot. In a preferred embodiment, a thin sheet having an opaque and a transparent layer is then bonded to span the slot in the plate. Preferably, the bonding is performed with the sheet under tension so as to prevent any possibility of its layer buckling as the plate expands and contracts. Either before or after the bonding step, slits are formed in the thin sheet by removing or making tansparent appropriate parts of the opaque layer in such a position that each slit stretches at least part way across the slot in the plate. It is important that the thin sheet alone, in response to a unit tension load elongate very much more per unit length than the frame does when both are stressed in the direction which the thermal expansion of interest occurs. This permits the frame to in effect act as the only factor in the amount of dimensional variation caused by temperature changes. In other embodiments, the thin sheet may be clear initially, and the bars laid down on it accurately.

DESCRIPTION OF THE PREFERRED EMBODIMENTS

Figure 1:
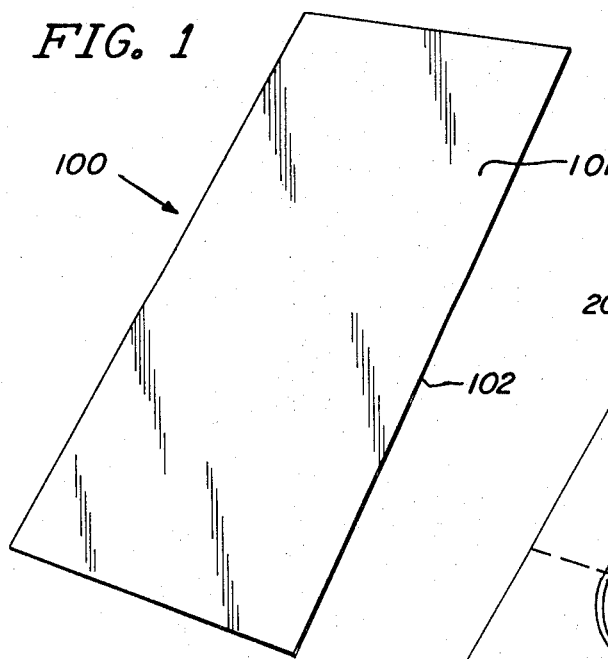
FIG. 1 is a thin sheet on which the grating bars are created.

FIG. 1 discloses a thin sheet 100 having an opaque layer 101 and a transparent layer 102. Opaque layer 101 may be only a thin coating of any convenient opaque material. However, it is preferred in my embodiment that it be a thin sheet of copper, and transparent layer 102 be formed of clear, thermal-setting plastic.

Figure 2:
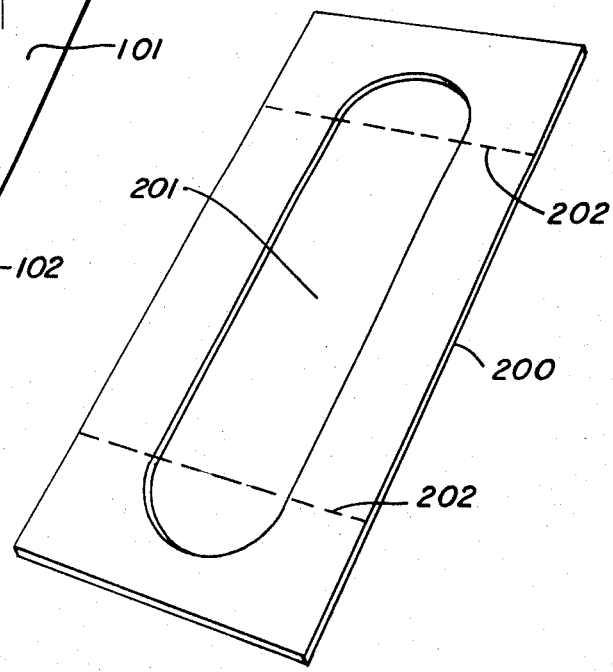
FIG. 2 is the frame of the grating.

Aluminum plate 200 in FIG. 2 furnishes a strong rigid frame for support of sheet 100. Plate 200 must be fabricated either from the material whose thermal expansion characteristics are to be duplicated by the grating or from material whose characteristics are very similar. For example, where the thermal expansion characteristics of an aluminnum magnetic recording disc are to be duplicated, plate 200 can be formed from the same aluminum. Slot 201 pierces plate 200 and may be of any desired shape which allows passage of light through plate 200 as plate 200 is shifted back and forth along a straight line. Slot 201 has sides which are spaced apart by less than the width of sheet 100, so that when sheet 100 is placed in a preferred position between dotted lines 202, it completely overlaps at least the long parallel sides of slot 201, and preferrably all of slot 201.

Figure 3:
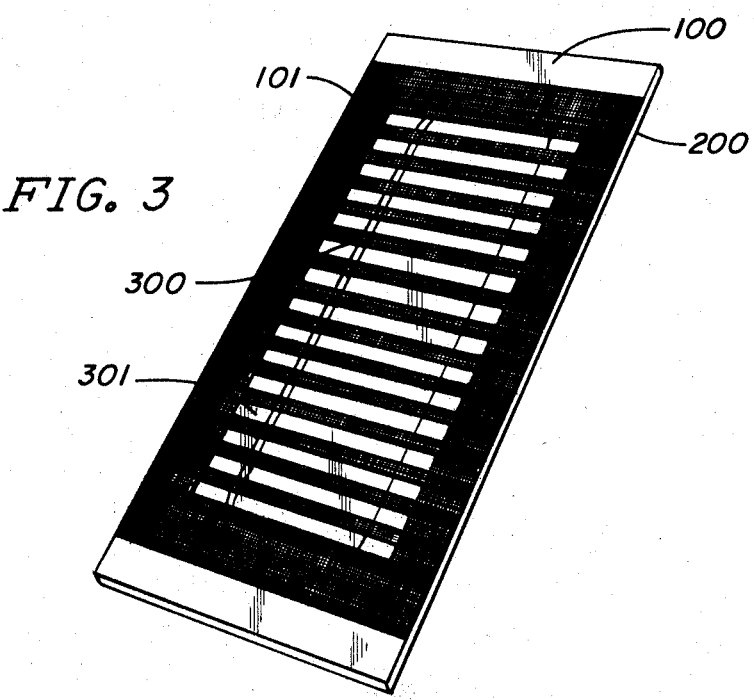
FIG. 3 shows the final product of this method.

After sheet 100 and plate 200 have been formed, sheet 100 is bonded to plate 200 between dotted lines 202, as shown in FIG. 3. While the bonding is done, sheet 100 should be placed in tension in both axes so as to prevent its later sagging or bowing caused by thermally-induced dimensional changes. Either before or after the bonding operation, slits 300 are created in sheet 100. This can be done in a variety of ways. One preferred method is to create a mask on sheet 100 and etch away portions of opaque layer 101 to form slits 300 which define qrating bars 301. In this case, opaque layer 101 and the etchant must be chosen according to the well-known appropriate teachings of the etching art. Sandblasting employing a mask and actual machining such as a scribing or engine dividing step may also be used in removing the portions of opaque layer 101.

Whether to create slits 300 in opaque layer 101 before bonding of sheet 100 to frame 200 depends on several factors. If sheet 100 is relatively dimensionally unstable during humidity, temperature, etc. variations, and particularly if high accuracy is needed in the spacing of slits 300, then is preferable to form the slits after the bonding step. However, if the slits are formed by etching, and plate 100 is formed of material attacked by the mordant, this is a reason for forming these slits prior to bonding sheet 100 to plate 200, because then there is no need to protect plate 100. It is important that sheet 100 be able to withstand mechanical stresses to which it will be exposed because of expansion and contraction of plate 200, without failure. Thus, a resilient plastic is preferred to comprise sheet 100. It is preferred that sheet 100 completely overlap slot 201 to further prevent warping and distortion during dimensional changes.

An alternative to having an opaque layer 101 on sheet 100, which is later formed into the slit pattern defining grating bars 301, is to start with a transparent shheet 100 and form bars 300 thereon in some convenient fashion. A very large number of ways to form a suitable slit pattern using this approach are available. The entire surface of sheet 100 can be activated according to well-known practice to allow electroless plating thereon. A mask can be placed on sheet 100 which causes plating to occur at exposed areas, which then form bars 301. A surface of sheet 100 can be similarly treated with a conductive film, and a similar mask can be used to cause electro-deposition in the desired pattern. The slit pattern can be formed photographically by using an appropriate mask. Still another method can employ a mask to control sputtering deposition, and bars 301 created in this manner.

It is clear from the discussion that a wide variety of variations on the basic method may be employed to form an optical grating which has expansion characteristics identical or nearly so to that of any desired material, by simply fabricating plate 200 from that material. The advantages yielded by this technique are high accuracy at relatively low cost. Experimentation has shown that optical gratings manufactured according to this technique have thermal expansion characteristics which repeat themselves reliably over a large number of temperature cycles.

Having thus described my invention, what I claim is:

1. A method for forming an optical grating having the thermal expansion characteristics of a preselected material, comprising the steps of
   a. forming a flat plate of material having the thermal expansion characteristics of the preselected material;
   b. cutting a slot of preselected width piercing the plate;
   c. forming a thin flat sheet wider in a first direction than the slot, whose elongation per unit length per unit tension perpendicular to the first direction is substantially greater than for the plate along the direction of its slot, said sheet having a transparent layer;
   d. forming on the sheet a plurality of slits generally lying in the first direction which form the desired grating pattern, and
   e. bonding the sheet to the plate in a position situating at least a portion of each slit within the slot.

2. The method of claim 1 wherein the bonding step includes the step of simultaneously applying tension to the sheet during the bonding step.

3. The method of claim 1, wherein the slit-forming step follows the sheet-bonding step.

4. The method of claim 1, wherein the slit-forming step precedes the sheet-bonding step.

5. The method of claim 1, wherein the thin flat sheet-forming step further includes the step of dimensioning the sheet to completely overlap the slot in the plate on all sides.

6. The method of claim 1, wherein the plate-forming step includes the step of forming the plate from the preselected material.

7. The method of claim 1, wherein the sheet-forming step comprises forming a sheet having an opaque layer and a transparent layer and the slit-forming step comprises removing portions of the opaque layer to form the slits.

8. The method of claim 1, wherein the slit-forming step comprises the step of depositing opaque bars on the sheet defining the slits between them.

* * * * *